US008539316B2

(12) United States Patent
Jeanne et al.

(10) Patent No.: US 8,539,316 B2
(45) Date of Patent: Sep. 17, 2013

(54) METHOD AND DEVICE FOR SYNCHRONIZING RECEPTION OF DATA PACKETS

(75) Inventors: Ludovic Jeanne, Rennes (FR); Patrick Fontaine, Rennes (FR); Charline Guguen, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 891 days.

(21) Appl. No.: 12/225,017

(22) PCT Filed: Mar. 7, 2007

(86) PCT No.: PCT/EP2007/052133
§ 371 (c)(1),
(2), (4) Date: Jan. 15, 2009

(87) PCT Pub. No.: WO2007/104686
PCT Pub. Date: Sep. 20, 2007

(65) Prior Publication Data
US 2009/0296921 A1 Dec. 3, 2009

(30) Foreign Application Priority Data

Mar. 13, 2006 (FR) ..................................... 06 50841

(51) Int. Cl.
*G06F 11/00* (2006.01)
(52) U.S. Cl.
USPC ........................................................ 714/776

(58) Field of Classification Search
None
See application file for complete search history.

(56) References Cited

U.S. PATENT DOCUMENTS

| 5,570,368 A | 10/1996 | Murakami et al. |
| 6,819,658 B1 | 11/2004 | Agarwal et al. |
| 2002/0114301 A1* | 8/2002 | Yee et al. ........................ 370/338 |

FOREIGN PATENT DOCUMENTS

| CA | 2273522 | 1/2000 |
| EP | 0486919 | 5/1992 |
| JP | 7321819 | 12/1995 |
| WO | WO 97/37509 | 10/1997 |
| WO | WO 00/74282 | 12/2000 |

OTHER PUBLICATIONS

Search Report Dated Apr. 11, 2007.

* cited by examiner

*Primary Examiner* — Christopher McCarthy
(74) *Attorney, Agent, or Firm* — Tutanjian & Bitetto, P.C.

(57) ABSTRACT

In order in particular to allow a synchronization on data packets, the method comprises:
 a first check that a data set which would be protected by an error detection code, does not comprise any error, the frame comprising the data set;
 a synchronization on one of the packets comprising the set if the check indicates that the data set does not comprise any error.
The invention also relates to a corresponding synchronization module and an apparatus implementing this module.

19 Claims, 8 Drawing Sheets

METHOD AND DEVICE FOR SYNCHRONIZING RECEPTION OF DATA PACKETS

This application claims the benefit, under 35 U.S.C. §365 of International Application PCT/EP2007/052133, filed Mar. 7, 2007, which was published in accordance with PCT Article 21(2) on Sep. 20, 2007 in English and which claims the benefit of French patent application No. 0650841, filed Mar. 13, 2006.

1. FIELD OF THE INVENTION

The present invention relates to the field of telecommunications and more precisely to the transmission of packets over a noisy channel.

2. TECHNOLOGICAL BACKGROUND

According to the state of the art, methods for transmitting data packets implement error detection mechanisms making it possible to eliminate the erroneous packets.

According to the IEEE802.16 wireless communication standard, MAC frames consisting of physical frames (or "bursts") comprise PDUs (standing for "Packet Data Units"). Each PDU comprises a header, data and a CRC (standing for "Cyclic Redundancy Check"). The CRC makes it possible to check whether the packet is in error. The header is itself protected by an HCS (standing for "Header Check Sum") making it possible to disregard an erroneous header. The length of the PDUs is variable and is indicated in the header. Also, according to a first known implementation, when the HCS of a PDU is erroneous, the current PDU and the PDUs following are not taken into account. In order to alleviate this drawback, the IEEE802.16 standard envisages an optional mechanism for retrieving the start of the following PDUs, this mechanism being called "Transmission Convergence Sublayer". According to this mechanism, the physical frame is divided into several data segments (for example OFDM symbols) protected by a Reed-Solomon code. The Reed-Solomon decoder can indicate to the DLC (standing for "Data Link Control") layer that the current segment is good. A specific byte is inserted at the start of each segment to indicate the start of the next PDU commencing in the segment considered. Thus, by decoding each segment and by reading this specific byte, it is possible to identify the following PDU and therefore to synchronize reception again after a bad HCS. This technique nevertheless presents the drawback of being relatively complex (processing of a signal arising from a Reed-Solomon decoder) and consumes bandwidth.

3. SUMMARY OF THE INVENTION

The invention is aimed at alleviating these drawbacks of the prior art.

More particularly, the invention is aimed at allowing synchronization on the data packets received, when the header of these data packets comprises error detection means, while limiting bandwidth consumption.

For this purpose, the invention proposes a method of receiving a frame comprising data packets protected by at least one error detection code, the method comprising the following steps:

first check that a first data set which would be protected by a first error detection code, does not comprise any error, the frame comprising the first data set;

synchronization on one of the packets comprising the set if the check indicates that the first data set does not comprise any error.

According to an advantageous characteristic, the method comprises a step of second check of the presence of predetermined data in the first data set, the synchronization being performed if the predetermined data are present in the first data set.

According to a preferred characteristic, the method comprises a step of third check that a second data set which would be protected by a second error detection code, does not comprise any error, the frame comprising the second data set, the second data set itself comprising the first data set.

According to a particular characteristic, the method comprises a step of reading in the first set, of a cue representative of the length of the second set.

Preferably, the frame is compatible with an IEEE802.16 standard.

According to another particular characteristic, the method comprises the steps of:

reception of data frames;

extraction of at least one first data packet, the start of each first data packet being identified with respect to the start of the frame or of a preceding data packet;

fourth check of the validity of at least part of each first data packet with the aid of the first error detection code;

implementation of the steps of first check and of synchronization when the step of fourth check indicates that at least part of a first data packet is not valid.

The invention also relates to a module for synchronization on a frame comprising data packets protected by at least one error detection code, the module comprising:

first means of checking that a first data set which would be protected by a first error detection code, does not comprise any error, the frame comprising the first data set;

means of synchronization on one of the packets comprising the set if the check indicates that the first data set does not comprise any error.

Advantageously, the first checking means comprise a plurality of first decoders of the first code, at least part of the first decoders respectively decoding data sets arising from the frame, shifted temporally.

Preferably, the module comprises second means of checking that a second data set which would be protected by a second error detection code, does not comprise any error, the frame comprising the second data set, the second data set itself comprising the first data set.

According to a particular characteristic, the second checking means comprise a plurality of second decoders of the second code.

According to another characteristic, each of the second decoders is associated with one of the first decoders, the second decoder being suitable for checking a second data set comprising a first set, that a first decoder associated with the second decoder is suitable for checking.

According to yet another characteristic, each of the second decoders is associated with the set of the first decoders, the second decoder being suitable for checking a second data set comprising a first set, that any one of the first decoders is suitable for checking.

Advantageously, the module comprises means for distinguishing two operating modes:

a mode termed synchronized, the checking means checking that data corresponding to synchronized packet does not comprise any error;

a mode termed unsynchronized, the packet synchronization being searched for by the checking means and the synchronization means.

The invention also relates to a reception apparatus for receiving data frames, comprising means of reception of the frames and at least one synchronization module such as previously described according to the invention.

4. LIST OF FIGURES

The invention will be better understood, and other features and advantages will appear on reading the description which will follow, the description referring to the appended drawings among which:

Figure 3:
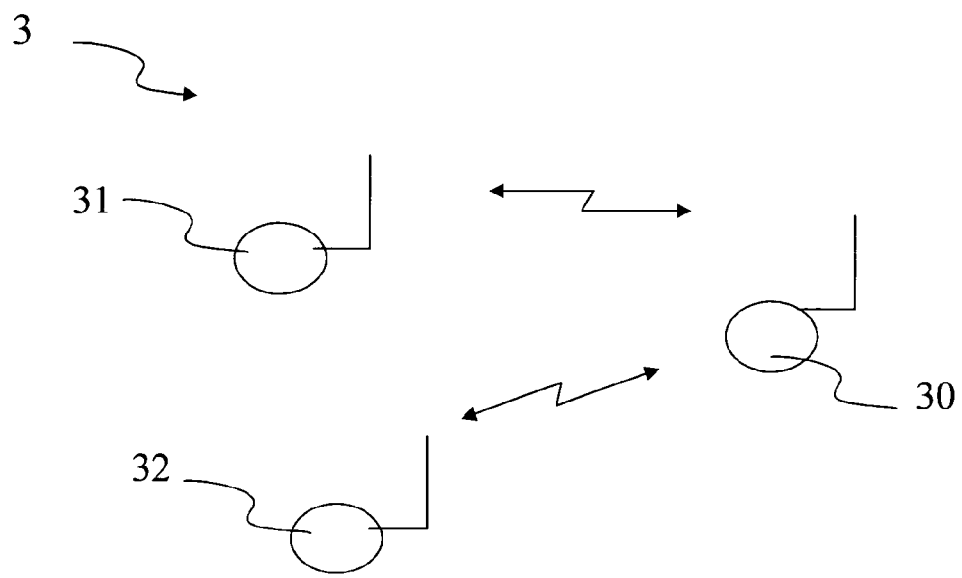
FIG. 3 represents a communication network according to a particular embodiment of the invention.
Figure 10:
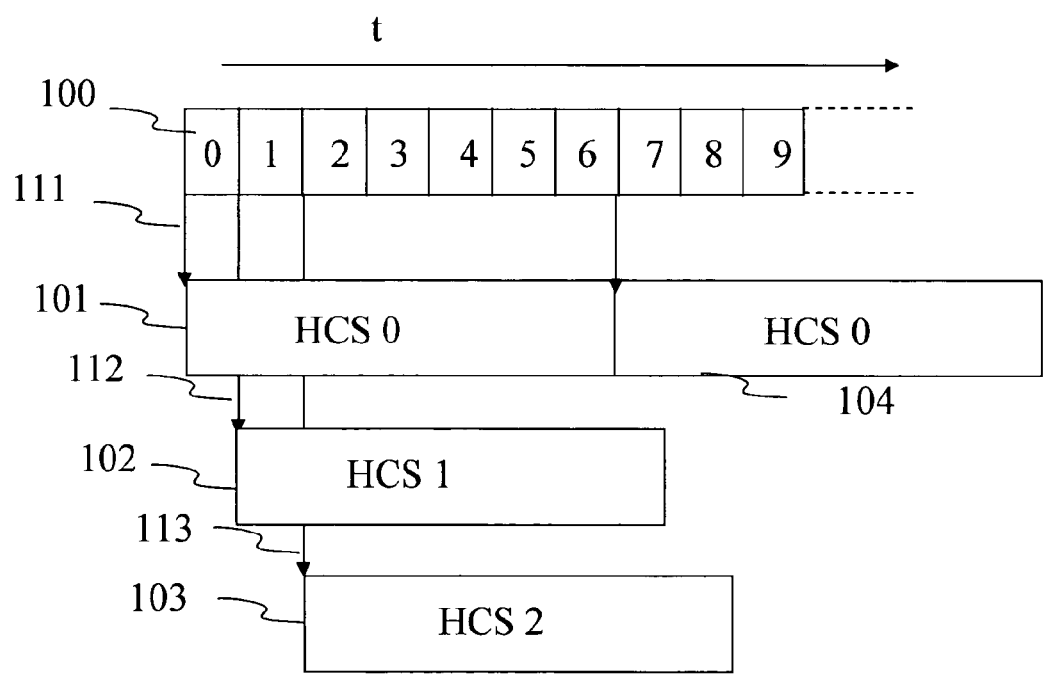
Figure 4:
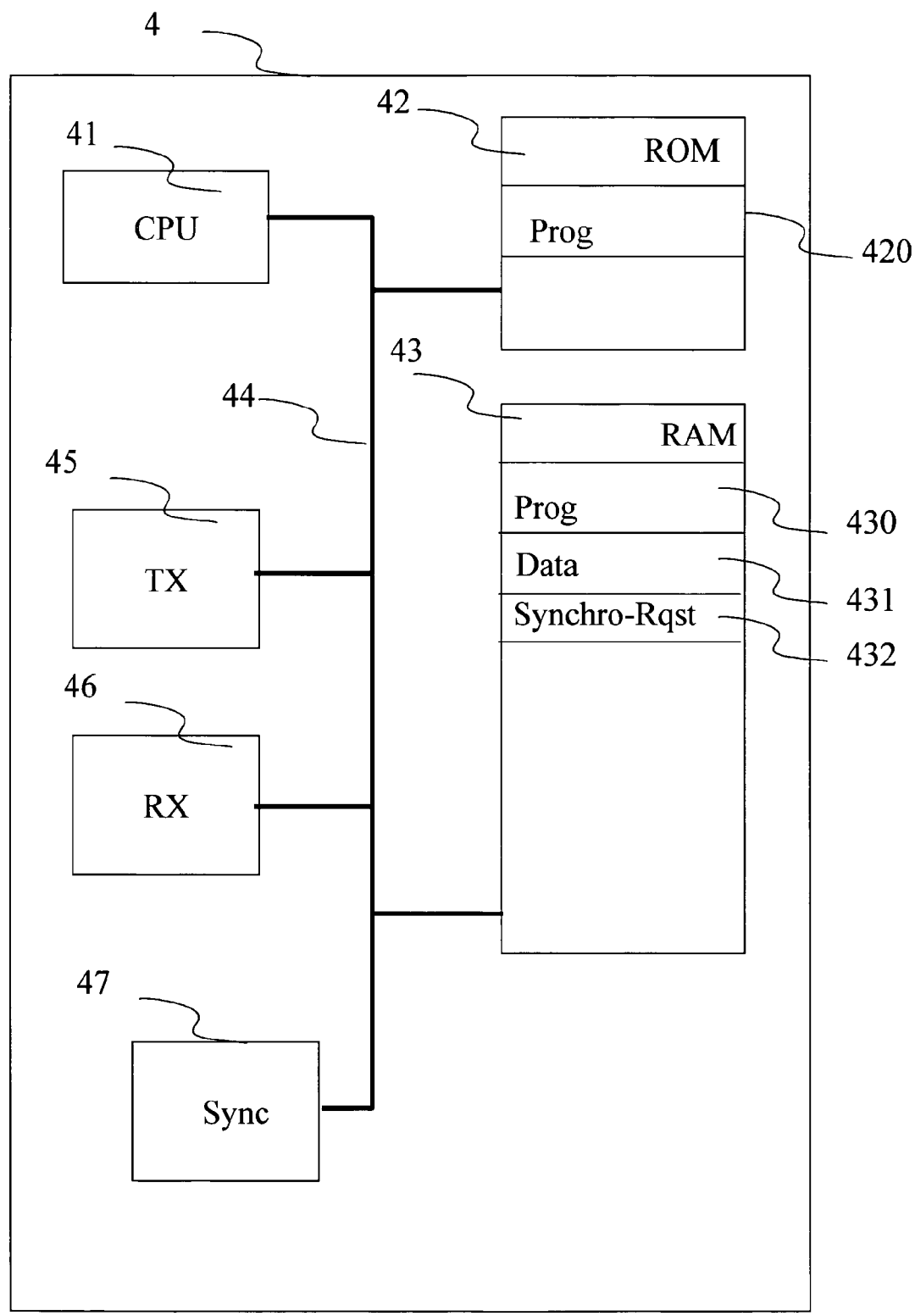
Figure 5:
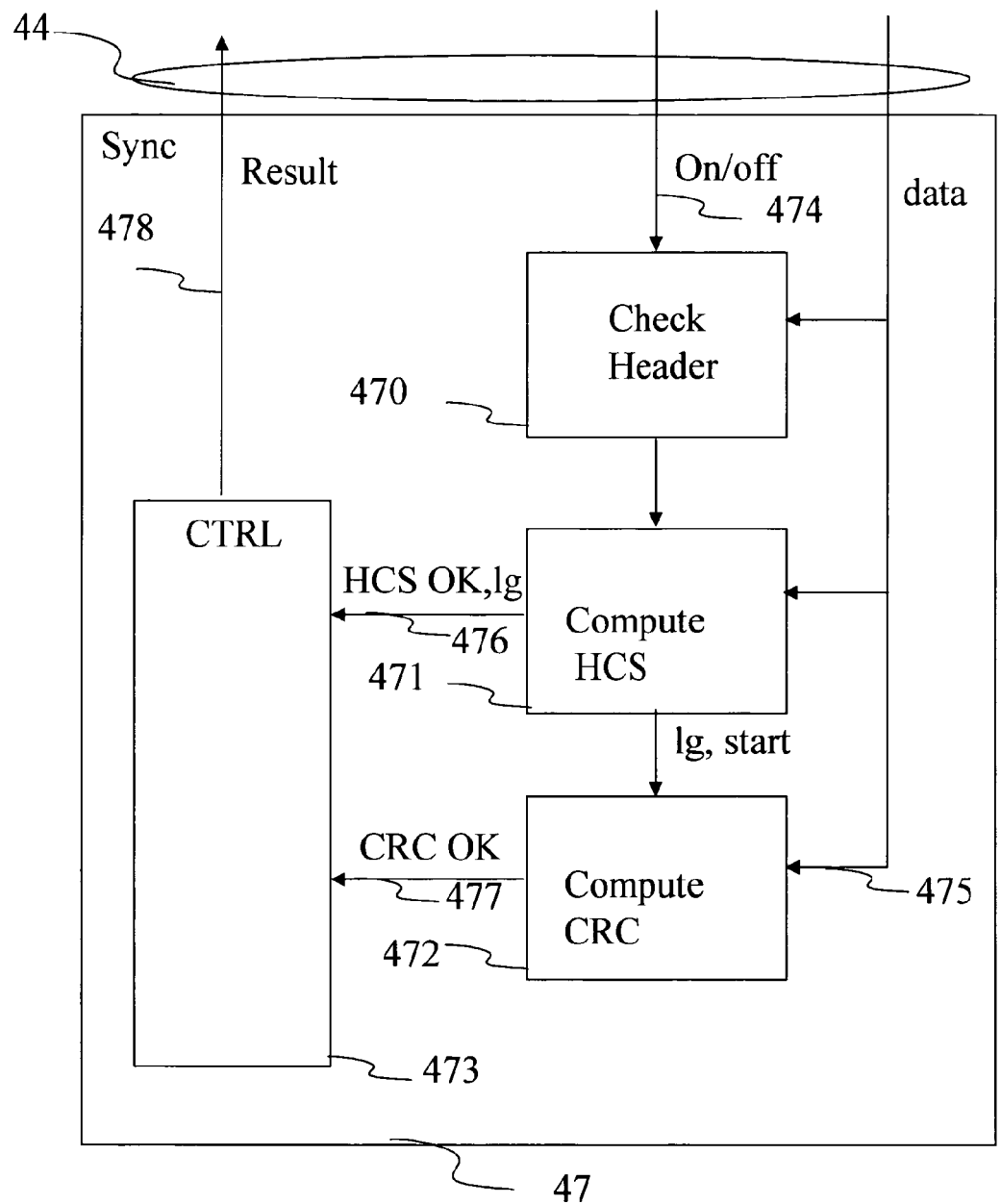
Figure 6:
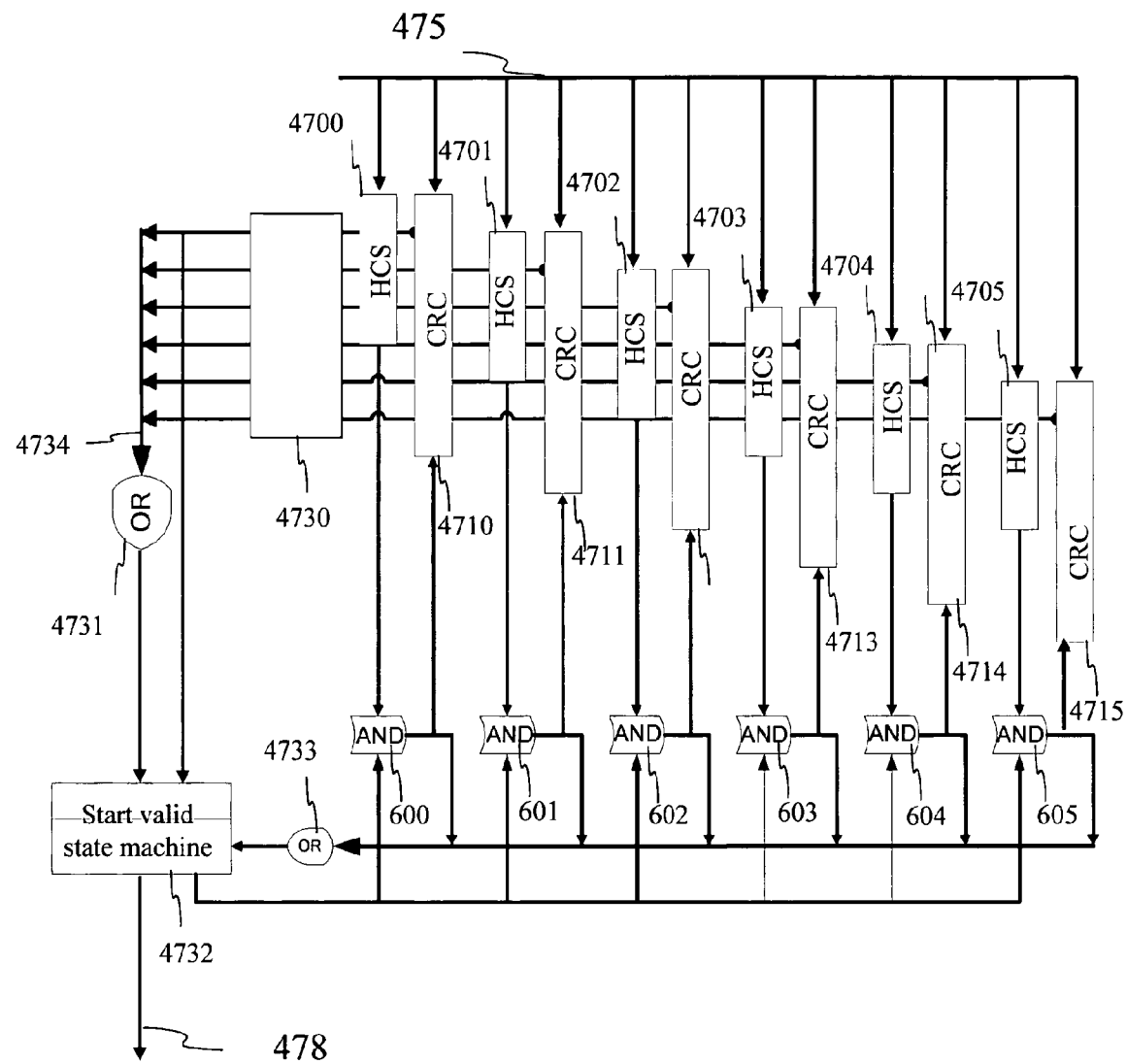
Figure 7:
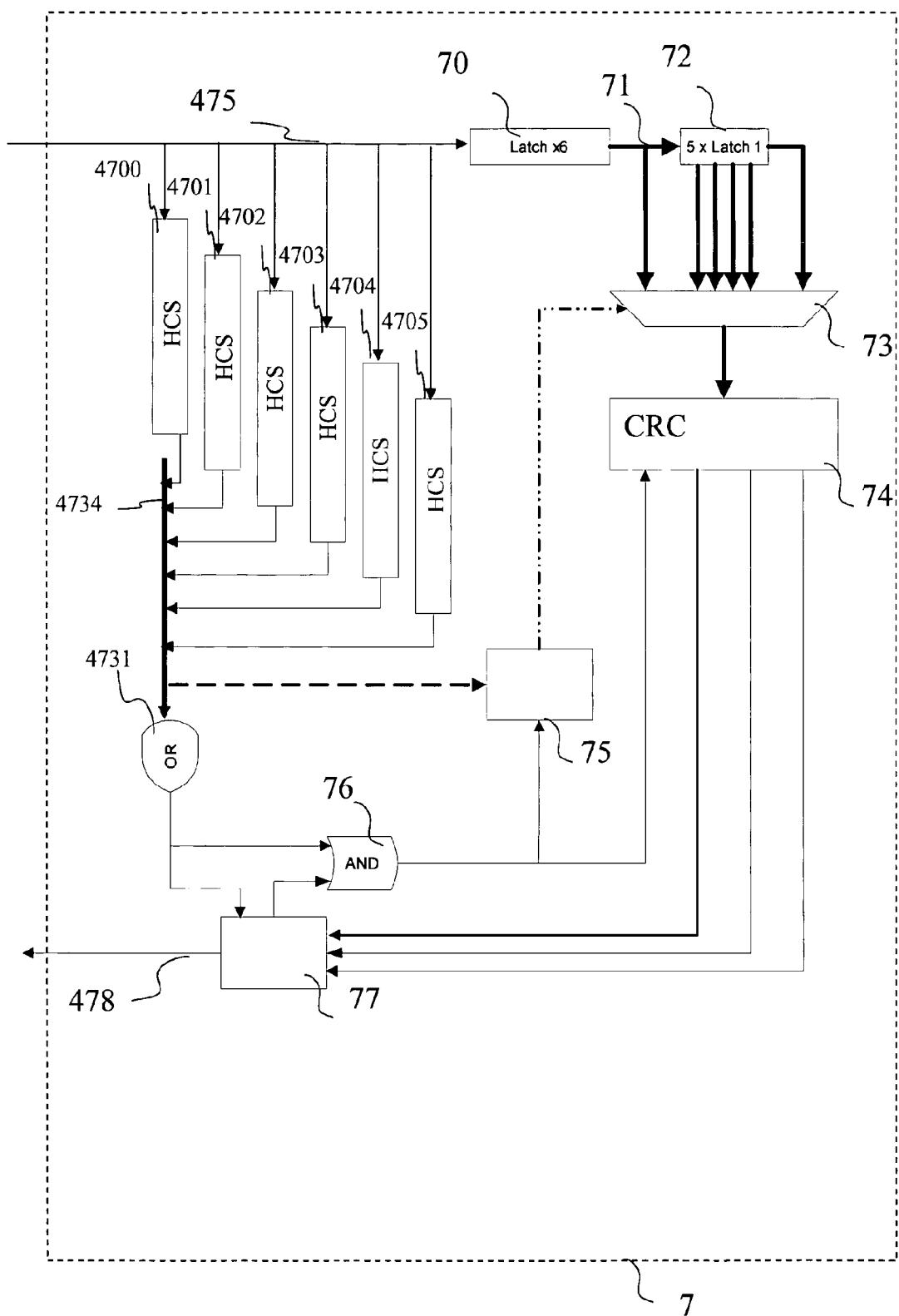
Figure 8:
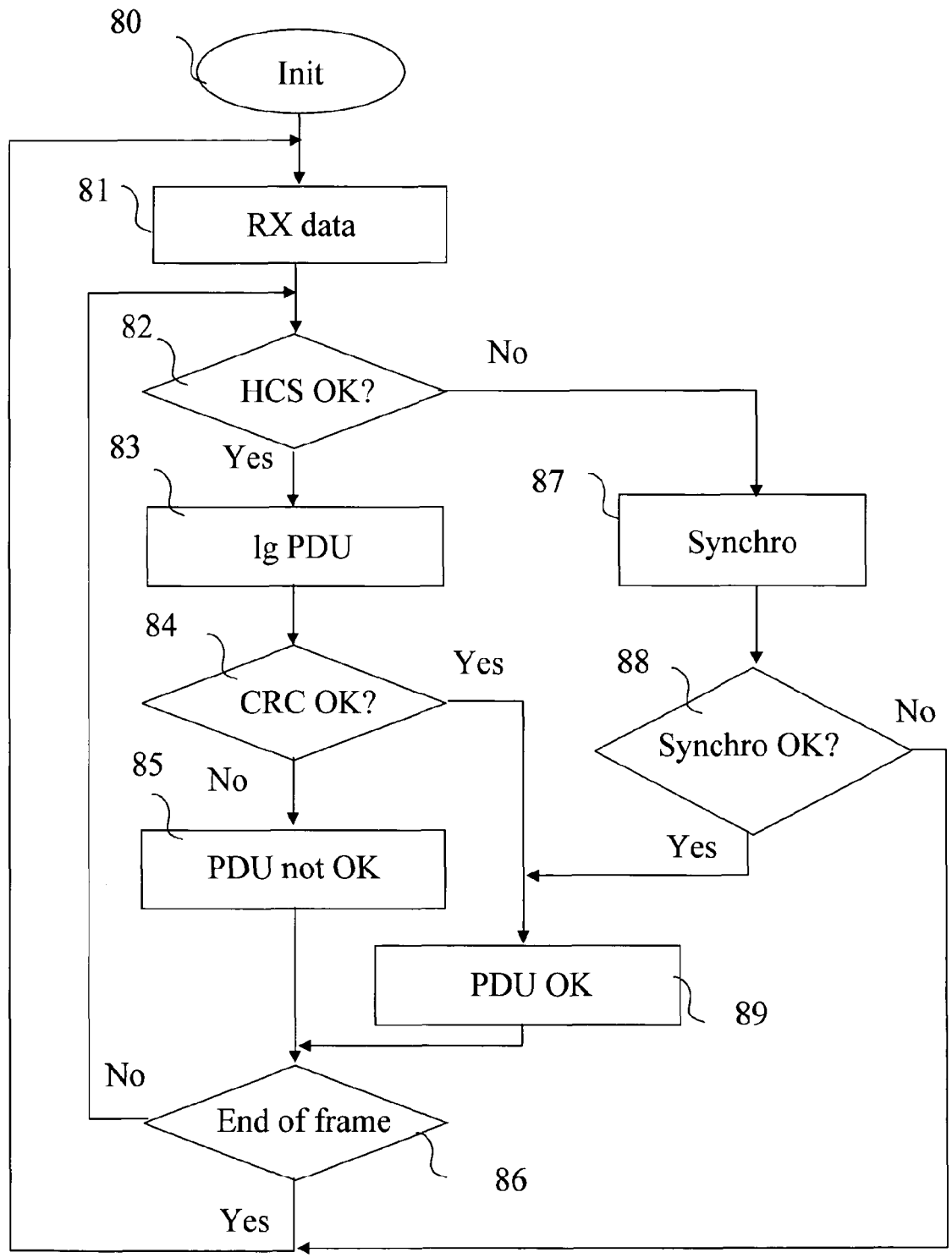
Figure 9:
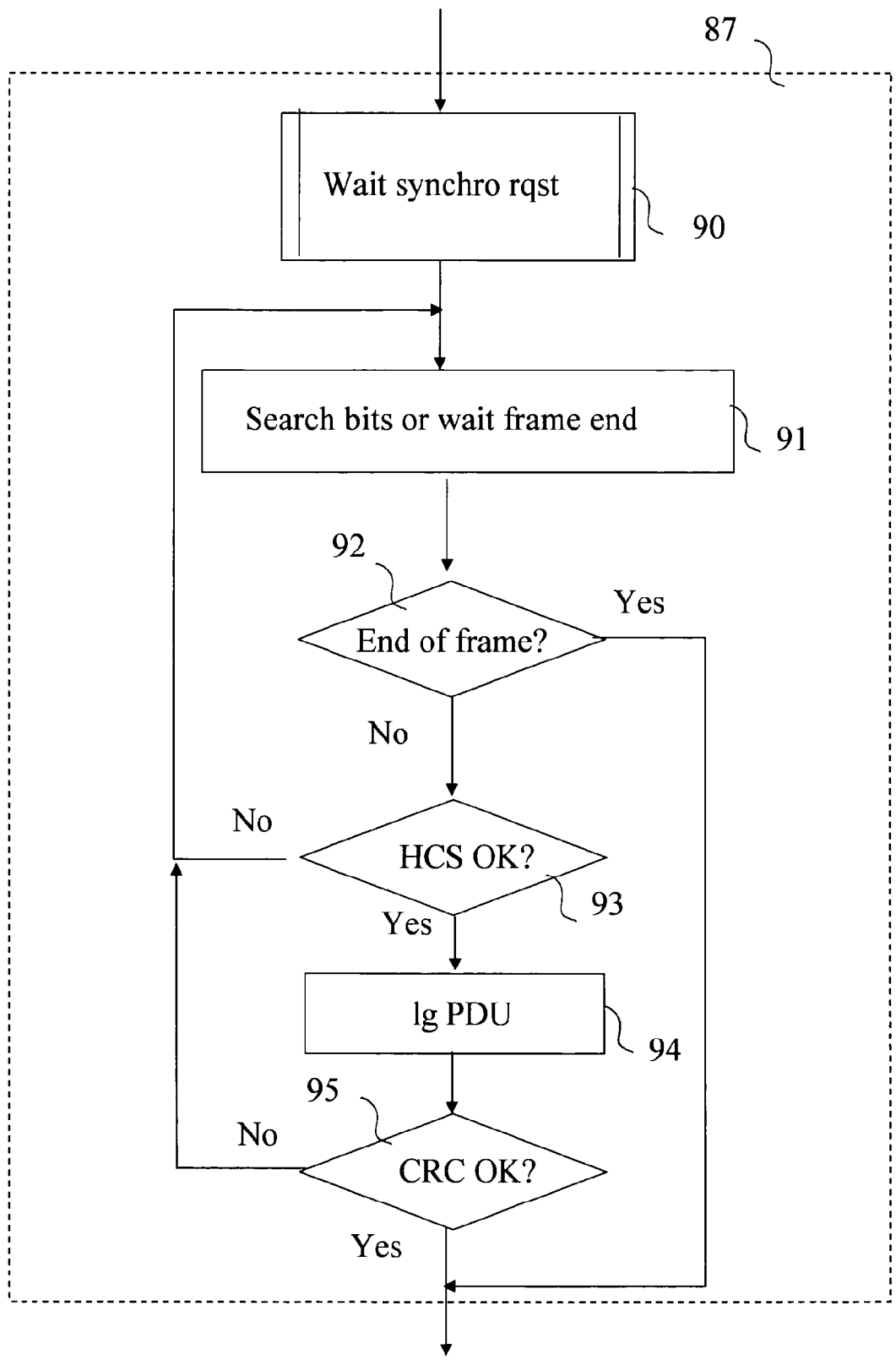

FIG. 4 diagrammatically illustrates a receiver of FIG. 3, according to a particular embodiment of the invention;

FIGS. 5 to 6 present a synchronization module implemented in the receiver of FIG. 4;

FIG. 7 presents a synchronization module according to a variant of the invention;

FIGS. 8 and 9 present a reception method implemented in the receiver of FIG. 4; and FIG. 10 illustrates a byte shift supplied to decoders of the receiver of FIG. 4.

5. DETAILED DESCRIPTION OF THE INVENTION

Figure 1:
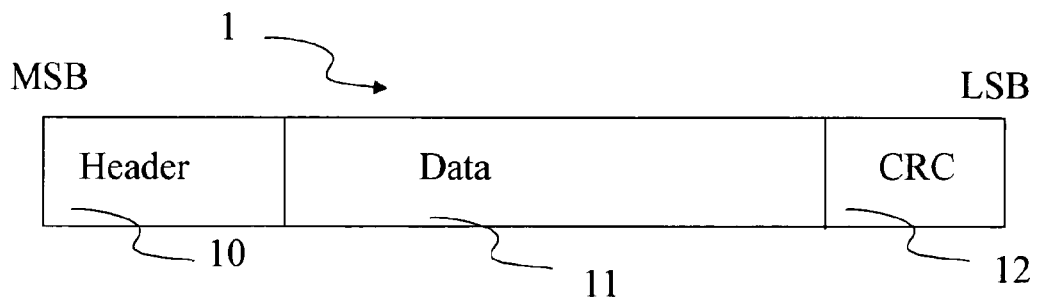
FIGS. 1 and 2 illustrate data packet formats.

FIG. 1 presents a PDU 1 according to the IEEE802.16 standard, which comprises:
- a header 10 (high weight or MSB side);
- data 11;
- a CRC 12 (low weight or LSB side).

Figure 2:
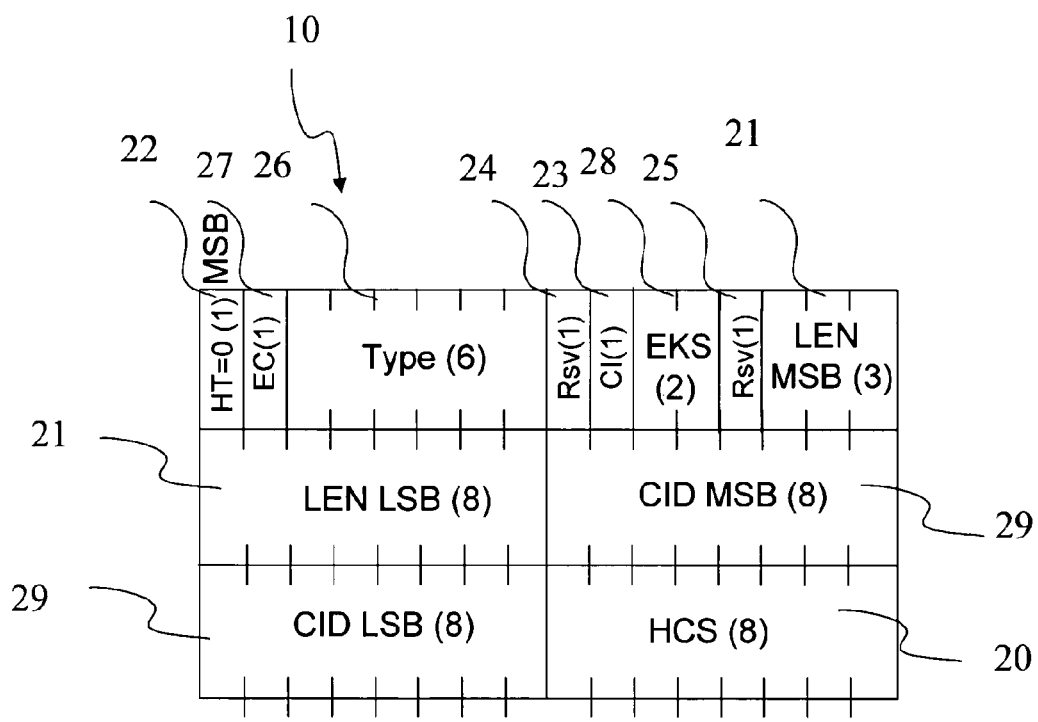

FIG. 2 specifies the structure of the header 10 which comprises:
- a first byte comprising a first bit HT 22 (or "header type"), a bit EC 27, a type field 26 of 6 bits;
- a second byte comprising a first reserved bit 24, a bit Cl 23 indicating the presence of a CRC in the PDU, two bits EKS 28, a second reserved bit 25, three bits representing the high weights of the length 21 of the data 11;
- a third byte comprising the low weight bits of the length 21 of the data 11;
- fourth and fifth bytes comprising an identifier CID 109; and
- a sixth byte comprising an HCS 20.

The HCS 20 makes it possible to detect errors in the header 10.

FIG. 3 represents a communication network 3 according to a particular embodiment of the invention.

The network 3 is, for example, an IEEE802.16 wireless network and comprises:
- an access point 30;
- terminals 31 and 32.

The access point 30 is able to send or receive MSDUs destined for the terminals 31 and 32 on the wireless link.

FIG. 4 diagrammatically illustrates an apparatus 4 corresponding to the access point 30 or to one of the terminals 31 and 32.

The apparatus 4 comprises, linked together by an address and data bus 44, also transporting a clock signal:
- a microprocessor 41 (or CPU);
- a nonvolatile memory of ROM type (standing for "Read Only Memory") 42;
- a random access memory or RAM 43;
- a module 45 for transmitting a signal on the wireless link;
- a module 46 for receiving a signal on the wireless link; and
- a module 47 for synchronization on data received in a physical frame.

Moreover, each of the elements 41 to 46 is well known to the person skilled in the art. These common elements are not described here.

It is observed that the word "register" used in the description of the memories 42 and 43 designates in each of the memories mentioned, either a memory area of small capacity (a few binary data) or a memory area of large capacity (making it possible to store an entire program or all or some of the data representative of an audio/video service received).

The ROM memory 42 comprises in particular a program "prog" 420.

The algorithms implementing the steps of the method described hereafter are stored in the ROM memory 42 associated with the apparatus 3 implementing these steps. On power-up, the microprocessor 31 loads and executes the instructions of these algorithms.

The random access memory 43 comprises in particular:
- in a register 430, the operating program of the microprocessor 41 loaded on power-up of the apparatus 4;
- data or PDUs containing these data in a register 431; and
- a variable "synchro-Rqst" indicating that a search for synchronization on PDUs is activated, in a register 432.

FIG. 5 diagrammatically illustrates the synchronization module 47 which comprises:
- a header checking block 470 which receives an on/off command (or initialization) 474 for the CPU 41 and data of the memory 431 or of the reception module 46 via the bus 44;
- an HCS calculation block 471 which receives a command from the block 470 and also the data;
- a CRC calculation block 472 which receives a command from the HCS calculation block and a length cue, as well as the data; and
- a monitoring module 473.

According to an advantageous embodiment of the invention, the header checking module 470 checks one or more bits having precise meanings in the header, in particular:
- the field 22 HT which when it is set to 0 indicates a PDU containing data;
- the field 23 Cl which, when it is equal to 1, indicates the presence of a CRC in the PDU; and
- the reserved fields 24 and 25 which are, according to the standard, equal to 0.

According to a preferred embodiment, to reduce the probability of false header detection, these four bits are checked (for example by inputting the data to a shift register, and by checking whether bits 1, 9, 10 and 13 (starting from the high weights) are respectively equal to 0, 0, 1 and 0 (for example with the aid of inverting gates applied to bits 1, 9 and 13 and of an "AND" gate applied to the four bits 9 (inverted), 13 (inverted), 1 (inverted) and 10 and whose output when set to 1 indicates that it may involve a header. This output can be used directly by the block 470 as command for the block 471. According to a variant, bits 1, 9, 10 and 13 are compared directly with the expected value.

According to other embodiments, only part of these bits is taken into account. Thus, by not considering the fields 24 and 25, there is the possibility of taking into account an upgrade of the standard IEEE802.11a and by not considering the field 23, it is possible to try to synchronize on a PDU whose data are not protected by a CRC.

The block 471 calculates the HCS of a set of six data bytes as a function of the command transmitted by the block 470. When the HCS is correct, the block 471 dispatches a correct HCS signal to monitoring module 473 and to the block 472. It also dispatches a cue of length of the PDU to the block 472, this length being identified with the presumed location of the field 21 in the tested block of six bytes. This length information can be transmitted in an explicit manner to the block 472 according to certain embodiment or implicit manner if the block 471 itself detects (with the aid of a counter initialized to the value of the length) the presumed end of the PDU (the command signal taking a predetermined value during the reception of the PDU by the block 472).

When the block 472 receives a CRC calculation command cue from the block 471, it calculates the CRC of the data received synchronized on the reception of the data by the blocks 470 and 471. Thereafter, the block 472 transmits a detected CRC signal to the monitoring module when the CRC is correct.

The monitoring module 473 receives a correctly or incorrectly decoded HCS indication from the block 471, a correctly or incorrectly decoded CRC indication and the content of a header corresponding to a PDU whose CRC and HCS are correct, these cues being provided by the block 472. Thereafter, the module 473 transmits to the CPU 41 a synchronization search and/or HCS and CRC check result signal 478 indicating that the module 47 has been able to synchronize on a received PDU and/or has been able to check that the CRC and HCS of a received PDU are correct. The signal 478 comprises, for example, a synchronization on PDU performed indication and, if the PDU synchronization has been able to be performed and/or the corresponding HCS and CRC are correct, the header of the corresponding PDU (thereby allowing the CPU to have directly the information that it can use directly (in particular the length of the PDU)) and its position of the PDU in the memory (for example, position of the first byte of the PDU).

According to certain embodiments of the invention, the synchronization module 47 is an electronic block comprising one or more discrete components (for example of the programmable ASIC or programmable component type) or inserted totally or in part in a component comprising other functions (for example ASIC comprising the memories 42 and/or 43 and/or the CPU 41). According to other embodiments of the invention, the module 47 is implemented totally or partially in computer form (for example, by a signal processor).

FIG. 6 illustrates an electronic implementation of the blocks 471 and 472 as well as of the module 473. According to this implementation, the synchronization module is used not only to perform a synchronization on a PDU when said synchronization is lost (the mode of operation of the module 47 being termed unsynchronized PDU mode), but also to check a PDU HCS and a CRC when the PDU synchronization is not lost (the mode of operation of the module 47 being termed synchronized PDU mode). Thus, the CRC and HCS calculation resources are, at least in part, also used for the conventional CRC and HCS check employing an inexpensive modification and the loss of synchronization can be detected directly by the module 47, which can react accordingly without additional intervention of the outside elements. After its initialization, when the module 47 begins to receive data, it is assumed that the first data correspond to a PDU header and that, therefore, the PDU synchronization is correct at the start. According to a variant of the invention, an additional signal of explicit synchronization request can be transmitted by the CPU 41, the CPU 41 being able at any moment to change the status of the PDU synchronization in the component 47 (for example, as a function of outside information).

The block 471 comprises six HCS decoders 4700 to 4705 supplied with data originating from the bus 475. Each of the decoders 4700 to 4705 is supplied with a shift corresponding to a byte so as to be able to process in parallel blocks of six bytes that may be PDU headers. FIG. 10 illustrates this shift. Thus, when data 100 are received (the bytes being numbered 0, 1, 2, . . . ), the first decoder 4700 begins to decode at the instant 111 a data block 101 of six bytes. With a shift of one byte on the block 101, the second decoder 4701 begins to decode at the instant 112, a data block 102 of six bytes. With a shift of two bytes on the block 101, the second decoder 4701 begins to decode at the instant 112, a data block 103 of six bytes and so on and so forth. When the decoder 4700 has terminated the checking of the block 101, it can check the block 104 shifted by six bytes with respect to the block 101. Thus, the block 471 can check in a continuous manner the CRCs of the incoming data.

The block 472 comprises six CRC decoders 4710 to 4715 supplied with data originating from the bus 475. Each of the decoders 4710 to 4715 is associated with a decoder 4700 to 4750, the supply of the decoders 4710 to 4715 being synchronous with that of the associated HCS decoder with a shift of a fixed number of bytes that is greater than or equal to six so as to take into account the processing time by the HCS decoder. When a decoder has checked the CRC corresponding to a packet and if this CRC is correct, a synchronization is performed and it sends a correct CRC signal as well as the content of the header of the synchronized PDU. According to a variant, a decoder can also only transmit the correct CRC signal, the information regarding header and/or positioning of the PDU (typically the value of the counter corresponding to the start of the PDU) can be read moreover by, in particular, the CPU 41 and/or any element of the module 47.

The module 473 comprises:
  a module 4730 concatenating the check results for the CRCs originating from the decoders 4710 to 4715, a correct CRC corresponding to a signal equal to 1 and recovering the header data of a synchronized PDU;
  an "OR" gate 4731 which receives as input the six signals 4734 of correct or incorrect CRC originating from the module 4730;
  a state machine 4732 which receives as input the output of the gate 4731 (CRC result checked by one of the decoders 4710 to 4715 on basis of the identified length) and indications on a data block of which:
    the header of six bytes which has a correct HCS value (checked by one of the decoders 4700 to 4705), as well as the bits checked by the block 470;
    a length (included in the header) corresponding to the value indicated by the presumed header; and
    an end-of-CRC-calculation indication (in the synchronized PDU mode).

The state machine 4732 is initialized by the writing to a specific reinitialization address of a predetermined data item (for example binary data item), this initialization being performed by the CPU 41. The machine then sets to zero a counter of bytes entering the module 47 and its mode is by default synchronized PDU mode (on initialization, the received frame is considered to be synchronized by the machine 4732 and the CPU 41).

The module 473 also comprises "AND" gates 600 to 605 linking respectively an HCS decoder 4700 to 4705 to a CRC decoder 4710 to 4715 whose input comprises the result of the output of a corresponding HCS decoder and the CRC decoding authorization transmitted by the machine 4732. These gates are supplied with a correct CRC signal originating from the corresponding HCS decoder and a signal originating from the machine 4732 and transmit the result of the operation to the corresponding CRC decoder and to an "OR" gate 4733. The state machine 4732 drives, in effect, the AND gates 600 to 605 to indicate to the CRC decoders 4710 to 4715 whether they are authorized to work or not, with the aid of a signal for monitoring the CRC decoders. In the synchronized PDU mode, this signal indicates only to the CRC decoder 4710 to 4715 that processes the PDU that it can check the CRC corresponding to this packet. In unsynchronized PDU mode, this monitoring signal is active and authorizes the CRC check to all the CRC decoders 4710 to 4715 so long as a PDU synchronization has not been performed. The output of the "OR" gate 4733 is linked to an input of the machine 4732 and makes it possible to indicate that a header HCS that may correspond to a PDU start is correct. In synchronized PDU mode, the machine 4732 thus has directly the HCS check result on a PDU start.

In unsynchronized PDU mode, when the state machine 4732 has obtained information on a data block all of whose parameters (checked bits, HCS, length and CRC) are compatible with a PDU, it transmits an information signal to the CPU 41. In synchronized PDU mode, when the machine 4732 has been able to check the HCS and the CRC of a PDU, it transmits it to the CPU 41. By default, the PDU synchronization and/or CRC and/or HCS check result is transmitted spontaneously by the module 47 to the CPU 41. According to a variant, in synchronized mode, only the values corresponding to a predetermined HCS and a predetermined CRC (for example correct or incorrect) are transmitted to the CPU 41. According to another variant, the CPU 41 reads the result after the transmission of the complete data block to the module 47 in synchronized mode or at predetermined instants or following a particular event in unsynchronized PDU mode.

According to a variant embodiment of the module 47, the HCS modules are grouped into a single HCS check block.

According to a variant embodiment, each HCS decoder is associated with several CRC decoders. Thus, if an HCS decoder detects a first block of six bytes with a correct HCS, it can instruct a first CRC decoder to check the CRC of the block beginning with this first block of six bytes and of a length corresponding to the length presumed field inside the first block of six bytes. If the HCS decoder again detects a correct CRC in a second block of six bytes while the first decoder is checking the CRC of the data block corresponding to the first block of six bytes, it can entrust to a second CRC decoder the checking of the CRC of a data block which begins with the second block of six bytes. In this way, if n CRC decoders are associated with an HCS decoder, then there can simultaneously be n CRC check for blocks beginning with headers shifted by an integer number of times six bytes.

According to another variant, the module 47 comprises several HCS decoders and several CRC decoders, the CRC decoders possibly being associated with any HCS decoder. Thus, a CRC decoder can check the CRC of a first data block on the basis of a command originating from a first HCS decoder and when it has terminated this check verify the CRC of a second data block on the basis of a command originating from another HCS decoder. Thus, the CRC decoding resources are shared by all the HCS decoders and are thus optimized. According to this variant embodiment of the invention, it is possible to have less than six CRC decoders for six HCS decoders.

According to a variant embodiment of the invention, the module 47 is used only to retrieve a lost PDU synchronization corresponding to the unsynchronized PDU mode previously described.

FIG. 7 illustrates a simplified embodiment 7 of the synchronization module 47 implementing only a CRC module 74.

The synchronization module 7 comprises HCS decoders 4700 to 4705 similar to the HCS decoders which bear the same references in the module 47.

It also comprises:
  a shift register 70 which allows a shift of six bytes of the incoming data signal 475;
  a shift register 72 supplied by the register 70 and which has six outputs each shifted by one byte;
  a selection block 75 supplied with the outputs of the decoders 4700 to 4705 which sends a command signal as a function of the decoder signalling a detected HCS;
  a multiplexer 73 which makes it possible to present as output the input signal shifted by six to eleven bytes, by selecting one of its inputs (outputs of the registers 70 and 72) as a function of the command signal sent by the block 75, this signal indicating the shift to be applied;
  a CRC decoder 74 similar to the decoder 3710 supplied with the output of the multiplexer 73;
  a state machine 77 supplied with result information provided by the decoder 74; and
  an "AND" gate 76 supplied with a correct HCS signal synchronized on a corresponding data block of 6 bytes originating from the gate 4731 and a monitoring signal originating from the machine 77, authorizing or not authorizing CRC checking, the output of the gate 76 being connected to an input of the block 75 and an input of the decoder 74.

When the decoder 74 has checked the CRC corresponding to a packet and if this CRC is correct, a synchronization is performed and it sends a correct CRC signal as well as the content of the header of the synchronized PDU to the machine 77.

The state machine 77 receives as input the output of the gate 4731 and indications on a data block (originating from the decoder 74) of which:
  the header of six bytes which has a correct HCS value as well as the bits checked by the block 470;
  a length (included in the header) corresponding to the value indicated by the presumed header; and
  an end-of-CRC-calculation indication (in the synchronized PDU mode).

The state machine 77 is initialized by the writing to a specific reinitialization address of a predetermined data item (for example binary data item), this initialization being performed by the CPU 41. The machine then sets to zero a counter of bytes entering the 7 and its mode is by default synchronized PDU mode (on initialization, the received frame is considered to be synchronized by the machine 77 and the CPU 41). The machine 77 moreover gives a result in the same way as the machine 4732.

FIG. 8 describes a procedure for receiving data with synchronization on PDU, this procedure being implemented in the previously illustrated synchronization modules or, more generally, by modules of any type making it possible to identify PDU starts following a loss of synchronization.

In the course of an initialization step 80, the receiver of physical frames containing PDUs initializes its various components and variables.

Thereafter, in the course of a step 81, the receiver waits and receives a physical frame of data containing PDUs (for example frame of the IEEE802.16 type), each frame comprising PDUs with header protected by an HCS and data, the PDU itself being protected by a CRC, the length of the PDU being specified in the header.

Then, in the course of a test 82, the receiver checks whether the HCS of the current first block of six bytes is correct.

In the affirmative, in the course of a step 83, the receiver extracts the length of the current PDU from the header.

Then, in the course of a step 84, the receiver checks whether the PDU whose header corresponds to the current block of six bytes and which has as length the length defined in the course of step 83, has a correct CRC.

In the affirmative, in the course of a step 89, the current block is considered to be a correct PDU and is transmitted to the associated application.

In the negative, in the course of a step 85, the current block is considered to be a bad PDU and is eliminated.

Following one of steps 85 or 89, in the course of a test 86, the receiver checks whether the current block is the last block of the frame.

In the affirmative, the frame end is detected and step 81 is repeated.

In the negative, the first block of six bytes which follows the current block (associated with the PDU), is considered to be the new current block of six bytes and step 82 is repeated.

If the result of the test 82 is negative, the receiver has lost the synchronization on the PDUs, and in the course of a step 87, the receiver tests the HCSs in a sliding window of blocks of six bytes to retrieve a synchronization, and checks the CRC of a corresponding block so as to identify a PDU. This process stops at the end of the frame if no PDU is identified.

Thereafter, in the course of a test 88, the receiver checks whether a synchronization has been performed (a PDU having been identified).

If a synchronization on a PDU has been performed, step 89 is executed. Otherwise, the frame end is reached without PDU synchronization and step 81 is repeated.

FIG. 9 details the operations implemented in step 87. This step is, for example, implemented by a microprocessor (for example in the form of a specific task integrated with the program present in the register 430) or by one or more electronic components (for example programmable component or ASIC).

Step 87 begins with a step 90, in the course of which the receiver waits then receives a PDU synchronization command (for example monitoring bit set to 1 driving all ANDs 600 to 605). According to a variant, the command is replaced with a signal authorizing or not authorizing PDU synchronization.

Thereafter, in the course of a step 91, the receiver searches for one or more specific bits in a sliding window of two consecutive bytes in the frame received or detects a frame end. The specific bit or bits are in particular among the bits having precise meanings in the header, and for example:
- the field 22 HT which when it is set to 0 indicates a PDU containing data;
- the field 23 CI which, when it is equal to 1, indicates the presence of a CRC in the PDU; and
- the reserved fields 24 and 25 which are, according to the standard, equal to 0.

As indicated previously, the search for bits can be done on the four bits 22 to 25 situated at precise locations. Thus, we determine whether the word of two bytes of the sliding window is of the form 0XXXXXXX01XX0XXX. For computer implementation, this comparison is, for example performed by applying to the two bytes a mask corresponding to the location of the bits searched for with the aid of an "AND" operation (in the case of a search for the four bits 22 to 25 such as illustrated in FIG. 2, the mask applied is 1000000011001000 in binary notation). Then, we check whether the result is equal to 0000000001000000.

Thereafter, in the course of a test 92, the receiver checks whether the preceding step has stopped following an end-of-frame detection (this operation can correspond to an initialization operation related to a frame end or a synchronization performed by another PDU synchronization or CRC checking module).

In the affirmative, the frame end is detected, and step 47 is terminated.

In the negative, we have detected the bit or bits searched for in two consecutive bytes and in the course of a test 93, the receiver checks whether the block of six consecutive bytes of the received frame beginning with the two bytes where the bit or bits searched for have been detected has a correct HCS.

In the negative, the HCS of the tested block of six bytes is not correct and step 91 is repeated.

In the affirmative, the HCS of the tested block of six bytes is correct and, in the course of a step 94, the receiver extracts the length field 21 in the corresponding block of six bytes (last three bits of the second byte and third byte).

Thereafter, in the course of a test 95, the receiver checks whether the block of n bytes (n representing the length 21) beginning with the block of six bytes with correct HCS has a correct CRC.

In the negative, the CRC of the tested block of n bytes is not correct and step 91 is repeated.

In the affirmative, the receiver has detected a block of n bytes corresponding with a very large probability to a PDU, and step 47 is terminated.

Of course, the invention is not limited to the embodiments described previously.

In particular, the architecture of the reception apparatus can be different from that illustrated in FIG. 4, in the respective function and/or the form of the elements (the functions of the electronic elements can in particular be grouped together in a restricted number of components or, conversely, dispersed in several components) and their arrangement.

Furthermore, the module for synchronization on PDUs can also have a different structure, the translation functions possibly being in particular integrated with one of the modules associated with the registers.

Moreover, according to the invention, detection of synchronization can be done on any packet protected by an error detection code (for example HCS or CRC), the packet being of known length (for example fixed length or identified by any means, this length being equal to six or different from six) or unknown length (checking being done for various lengths or on a window of variable size). A packet of known length makes it possible to simplify the implementation.

In the simplest embodiment of the invention, the detection of the start of a packet can be done solely on the detection of a data block whose content corresponds to an absence of error by assuming this block to be protected by a predetermined error detection code.

In order to reduce the number of false start-of-packet detections, according to the invention, the presence or the value of predetermined data is checked, these data corresponding to expected compulsory values or to a particular mode of data transmission.

In order also to reduce the number of false detections, if the packet is included in one or more larger packets, each being protected by an error detection code, the absence of errors in the larger packet or packets is checked with the aid of this error detection code.

In order also to reduce the number of false detections, if the packet is included in one or more larger packets, the presence or the value of predetermined data is checked. The order of the steps of start-of-packet detection and of checking of presence or of values of predetermined data is arbitrary, it being possible for all or part of the checking step to be done before or after the detection step. Nevertheless, if the checking step is performed before the detection step, the implementation is generally simplified.

In order also to reduce the number of false detections, if the packet comprises one or more smaller packets, each being protected by an error detection code, the absence of errors in the smaller packet or packets is checked with the aid of this error detection code.

Neither is the invention limited to the reception of data following a wireless communication standard (for example IEEE802.16) but also relates to any reception mode using codes for detecting errors in a received packet.

Furthermore, the invention is not limited to wireless transmissions but relates to all transmissions on any medium, and in particular on noisy wire channels or on a recording channel.

The invention claimed is:

1. Method of receiving a frame comprising data packets, wherein each data packet is protected by at least one error detection code, and wherein the method comprises the following steps:
    first checking that a first data set, which is protected by a first error detection code, does not comprise any error by computing a check value from said first data set, said frame comprising said first data set;
    second checking of the presence of predetermined data in the data from which said check value is computed; and
    performing synchronization on one of said packets comprising said set if said first checking indicates that said first data set does not comprise any error and if said predetermined data are present in the data from which said check value is computed, the synchronization being based on the first checking.

2. Method according to claim 1, further comprising a step of:
    third checking that a second data set, which is protected by a second error detection code, does not comprise any error, said frame comprising said second data set, said second data set comprising said first data set.

3. Method according to claim 2, further comprising a step of:
    reading in said first set a cue that is representative of the length of said second set.

4. Method according to claim 1, wherein said frame is compatible with an IEEE802.16 standard.

5. Method according to claim 1, further comprising the steps of:
    receiving data frames;
    extracting at least one first data packet, the start of each first data packet being identified with respect to the start of the frame or of a preceding data packet;
    fourth checking of the validity of at least part of each first data packet with the aid of said first error detection code; and
    implementing said steps of first checking and performing synchronization when said step of fourth checking indicates that at least part of a first data packet is not valid.

6. Module for synchronization on a frame comprising data packets, wherein each data packet is protected by at least one error detection code, and wherein the module comprises:
    a first checker for checking that a first data set, which is protected by a first error detection code, does not comprise any error by computing a check value from said first data set, said frame comprising said first data set;
    a second checker for checking the presence of predetermined data in the data from which said check value is computed;
    a synchronizer, implemented by at least one hardware processor, for synchronizing on one of said packets comprising said set if said checking by said first checker indicates that said first data set does not comprise any error and if said predetermined data are present in the data from which said check value is computed, the synchronization being based on the checking of the first checker.

7. Module according to claim 6, wherein said first checker comprises a plurality of first decoders of said first code, at least part of said first decoders respectively decoding data sets arising from said frame, shifted temporally.

8. Module according to claim 6, further comprising a second checker for checking that a second data set, which is protected by a second error detection code, does not comprise any error, said frame comprising said second data set, said second data set comprising said first data set.

9. Module according to claim 8, wherein said second checker comprises a plurality of second decoders of said second code.

10. Module according to claim 9, wherein each of said second decoders is associated with one of said first decoders, said second decoder being suitable for checking a second data set comprising a first set, that a first decoder associated with said second decoder is suitable for checking.

11. Module according to claim 9, wherein each of said second decoders is associated with the set of said first decoders, said second decoder being suitable for checking a second data set comprising a first set, that any one of said first decoders is suitable for checking.

12. Module according to claim 6, further comprising means for distinguishing two operating modes among:
    a synchronized mode, said first checker checking that data corresponding to synchronized packet does not comprise any error;
    an unsynchronized mode, the packet synchronization being searched for by said first checker and said synchronizer.

13. The reception apparatus according to claim 6, further comprising a second checker for checking that a second data set, which is protected by a second error detection code, does not comprise any error, said frame comprising said second data set, said second data set comprising said first data set.

14. The reception apparatus according to claim 13, wherein said second checker comprises a plurality of second decoders of said second code.

15. The reception apparatus according to claim 14, wherein each of said second decoders is associated with one of said first decoders, said second decoder being suitable for checking a second data set comprising a first set, that a first decoder associated with said second decoder is suitable for checking.

16. The reception apparatus according to claim 14, wherein each of said second decoders is associated with the set of said first decoders, said second decoder being suitable for checking a second data set comprising a first set, that any one of said first decoders is suitable for checking.

17. A reception apparatus for receiving data frames, the apparatus comprising a receiver for receiving said frames and at least one module for synchronization on a frame comprising data packets, wherein each data packet is protected by at least one error detection code, and wherein the module comprises:

a first checker for checking that a first data set, which is protected by a first error detection code, does not comprise any error by computing a check value from said first data set, said frame comprising said first data set;

a second checker for checking the presence of predetermined data in the data from which said check value is computed;

a synchronizer for synchronizing on one of said packets comprising said set if said checking by said first checker indicates that said first data set does not comprise any error and if said predetermined data are present in the data from which said check value is computed, the synchronization being based on the checking of the first checker.

18. The reception apparatus according to claim 17, wherein said first checker comprises a plurality of first decoders of said first code, at least part of said first decoders respectively decoding data sets arising from said frame, shifted temporally.

19. The reception apparatus according to claim 17, further comprising means for distinguishing two operating modes among:

a synchronized mode, said first checker checking that data corresponding to synchronized packet does not comprise any error;

an unsynchronized mode, the packet synchronization being searched for by said first checker and said synchronizer.

* * * * *